(12) United States Patent
LaBarca et al.

(10) Patent No.: US 9,910,148 B2
(45) Date of Patent: Mar. 6, 2018

(54) ADVANCED TECHNIQUES FOR GROUND-PENETRATING RADAR SYSTEMS

(71) Applicant: US Radar, Inc., Matawan, NJ (US)

(72) Inventors: Justin LaBarca, Matawan, NJ (US); Matthew Keys, West Windsor, NJ (US)

(73) Assignee: US Radar, Inc., Matawan, NJ (US)

( * ) Notice: Subject to any disclaimer, the term of this patent is extended or adjusted under 35 U.S.C. 154(b) by 215 days.

(21) Appl. No.: 14/635,646

(22) Filed: Mar. 2, 2015

(65) Prior Publication Data
US 2015/0247923 A1    Sep. 3, 2015

Related U.S. Application Data

(60) Provisional application No. 61/947,379, filed on Mar. 3, 2014.

(51) Int. Cl.
  *G01S 13/88* (2006.01)
  *G01S 7/28* (2006.01)
  *G01S 7/34* (2006.01)

(52) U.S. Cl.
  CPC ............. *G01S 13/885* (2013.01); *G01S 7/28* (2013.01); *G01S 7/34* (2013.01)

(58) Field of Classification Search
  CPC ............. G01S 13/885; G01S 7/28; G01S 7/34
  USPC .......................................................... 342/22
  See application file for complete search history.

(56) References Cited

U.S. PATENT DOCUMENTS

| | | | | |
|---|---|---|---|---|
| 5,900,833 A | * | 5/1999 | Sunlin | G01S 13/0209 342/22 |
| 9,547,070 B2 | * | 1/2017 | Corcos | G01S 13/34 |
| 2003/0030582 A1 | * | 2/2003 | Vickers | G01S 17/023 342/54 |
| 2003/0189511 A1 | * | 10/2003 | Lasky | G01V 3/12 342/22 |
| 2006/0038599 A1 | * | 2/2006 | Avants | H03H 11/265 327/276 |
| 2011/0148686 A1 | * | 6/2011 | Cole | G01S 13/32 342/22 |
| 2013/0088382 A1 | * | 4/2013 | Lee | G01S 7/4026 342/174 |
| 2014/0368442 A1 | * | 12/2014 | Vahtola | G06F 3/013 345/173 |

* cited by examiner

*Primary Examiner* — Timothy A Brainard
(74) *Attorney, Agent, or Firm* — Kaplan Breyer Schwarz, LLP

(57) ABSTRACT

A Ground Penetrating Radar (GPR) system makes use of digital circuitry for synchronizing the sampling of a received radar signal with a transmitted radar signal. The digital synchronization achieves improved waveform reproduction and greater receiver sensitivity. Furthermore, the system employs digital circuitry to control the gain of a receiver amplifier. The digitally controlled gain makes it possible to accurately calibrate the amplitude of received radar signals with great precision while achieving good dynamic range.

15 Claims, 1 Drawing Sheet

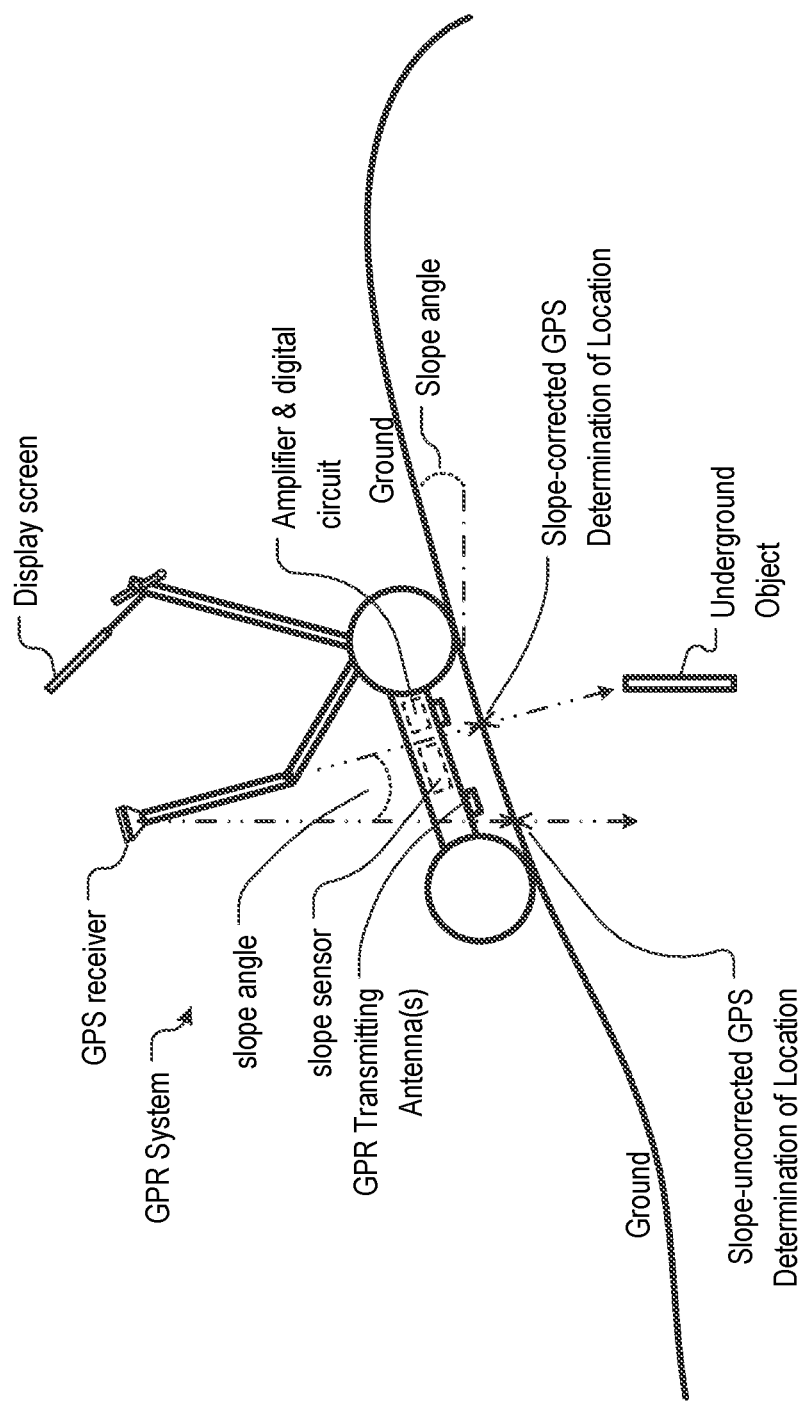

ADVANCED TECHNIQUES FOR GROUND-PENETRATING RADAR SYSTEMS

CROSS REFERENCE TO RELATED APPLICATIONS

This case claims priority of U.S. provisional application Ser. No. 61/947,379 filed on Mar. 3, 2014, which is incorporated herein by reference.

FIELD OF THE INVENTION

The present invention relates to radar detection techniques in general, and, more particularly, to Ground-Penetrating Radar (GPR) systems and techniques.

BACKGROUND OF THE INVENTION

Ground-penetrating radar (GPR) is a geophysical method that uses radar pulses to image the subsurface. This nondestructive method uses electromagnetic radiation in the microwave band (UHF/VHF frequencies) of the radio spectrum and detects the reflected signals from subsurface structures. GPR can have applications in a variety of media, including rock, soil, ice, fresh water, pavements and structures. GPR can be used to detect subsurface objects, changes in material properties, and voids and cracks.

A variety of considerations are important in the design and operation of a GPR device, some of which are discussed below.

Sampling-Circuits.

In the prior art, an Analog to Digital Converter (ADC) is used for time-equivalent sampling. A periodic signal is transmitted. One sample of the received signal is taken on each repetition of the periodic signal. The point where the sample is taken is advanced by a fraction of the period at each repetition such that, over time, samples are taken over the full period.

In the prior art, this progressive advancement of the sampling point is accomplished through analog techniques. For example, in a typical prior-art implementation, a first circuit generates a so-called saw-tooth waveform with the desired period, and a second circuit generates a second saw-tooth waveform having the same voltage range, but with a much longer period. The two waveforms are fed to the two inputs of a comparator which generates a trigger signal when the two waveforms have the same voltage value. The trigger signal can then be used, for example, to trigger the generation of the transmitted signal, while the faster sawtooth waveform can be used to cause the ADC to take a sample at a fixed point in the faster saw-tooth waveform.

Timing of Sampling.

In the prior art, analog saw-tooth waveforms are used. Timing accuracy depends on the linearity of the waveforms. Any distortion of the waveforms results in timing inaccuracies which, in turn, lead to errors in estimating the depth in the ground of detected objects.

System Configuration.

In the prior art, analog circuits offer only a limited range of configurations that are the hardware configurations that were envisioned when the system was designed.

Reference Pulse Timing.

In the prior art, the signal transmitted form the antenna can be monitored by coupling an attenuated version of it out of the transmission line that feeds the transmitting antenna. This attenuated version is referred to as a "reference pulse". In the prior art, a dedicated circuit is used to measure the exact timing of the reference pulse.

Amplifier Gain.

As already mentioned in a previous paragraph, in a typical prior-art implementation, a first circuit generates a so-called saw-tooth waveform with the desired period, and a second circuit generates a second saw-tooth waveform having the same voltage range, but with a much longer period. The second saw-tooth waveform is also used, in the prior art, to control the gain of an amplifier that amplifies the received signal (equivalently, gain control can be accomplished via a fixed-gain amplifier in conjunction with a variable attenuator). When reconstructing the actual received signal, it is important to know, with good accuracy, what the gain of the amplifier was at the time when each portion of the received signal was sampled. In the prior art, it takes a careful calibration of the analog waveform and of the relationship between waveform and amplifier gain to achieve the desired accuracy.

Multi-Frequency Operation.

In some applications, it is desirable to transmit multiple signals that, together, span a wide range of frequencies. Generally, antennas that are optimized for one frequency are not particularly good at different frequencies. In the prior art, different antennas are used for different signals at different frequencies, such that a system with multi-frequency capability needs to have multiple antennas.

Multi-Channel Operation.

Prior-art GPR technology involves using Step Recovery Diodes, one for each signal generator, to create ultra-wide band pulses. Each signal generator is connected to its own separate transmitting antenna, such that each antenna receives a signal from only one signal generator.

EM Sensor.

The prior art provides a single EM sensor integrated inside a GPR antenna housing.

GPS Accuracy.

In the prior-art, a GPS receiver is used to estimate the position of the GPR system while performing measurements.

Path Reconstruction.

A GPR system is usually mounted on a wheeled cart, with a shaft encoder attached to one of the wheels for measuring the distance traveled by the cart through a measurement of the number of turns experienced by the wheel.

Mechanical.

The mechanical housing and mount of prior-art GPR systems offer limited features for ease of use.

SUMMARY OF THE INVENTION

Embodiments of the present invention provide solutions to prior-art inadequacies and achieve more effective GPR systems as detailed in the following paragraphs.

BRIEF DESCRIPTION OF THE DRAWING

The FIGURE depicts a ground penetrating radar system in accordance with the illustrative embodiment of the present invention, wherein the ground penetrating radar system includes a slope sensor for correcting GPS-determined position of an underground object when the system is on sloping ground.

DETAILED DESCRIPTION

Sampling-Circuits.

In accordance with an illustrative embodiment, a digital circuit is used for generating both the trigger signal and to cause the ADC to take samples. The digital circuit comprises a so-called synchronous digital circuit, whose operation is paced by a clock signal. The clock signal is, preferably, at a frequency higher than the desired repetition frequency of the transmitted signal. For example, the clock frequency might be 200 MHz, while the period of the transmitted signal might be 1 MHz. The clock signal is generated by a highly accurate oscillator such as, for example, a crystal oscillator.

The synchronous digital circuit generates a signal that causes the ADC to take samples at periodic time intervals. The period of such intervals might be the same as the period of the transmitted waveform, as in the prior art, or it might be faster. For example, the ADC might take samples four times in each period of the transmitted waveform, which is advantageous because, compared with the prior art, a full period is then sampled in one-fourth the time.

The synchronous digital circuit also generates a coarse trigger signal whose timing, relative to when the ADC takes samples, is adjustable in increments equal to the period of the 200-MHz clock, which is 5 nanoseconds ("ns"). This is not enough resolution for accurately characterizing the received waveform; therefore, the digital circuit also comprises a programmable digital delay line. Such a delay line accepts the coarse trigger signal and generates a delayed version of it. Hereinafter, the delay caused by the delay line is referred to as fine delay. The fine delay is adjustable based on a digital input number applied to the delay line by the synchronous digital circuit. For example, the digital input number might be a ten-bit number that specifies the fine delay in increments of 10 picoseconds ("ps"). Since a ten-bit number represents values in the range 0-1023, the fine delay will be adjustable in a range between a minimum value and the minimum value plus 10.23 ns. The combination of coarse delay, with increments of 5 ns, and fine delay allows the generation of a trigger signal with an arbitrary timing, relative to ADC sampling, with a resolution of 10 ps.

This is better than the prior art because a) relative timing between ADC sampling and trigger circuit is much more accurate than achievable with analog techniques; and b) there is much more flexibility than with analog techniques. For example, with analog techniques in the prior art, the entire period of the transmitted signal is always sampled. With this invention, if it is desired to examine a small portion of the period, the digital circuit can generate trigger signals that span only the desired portion of the period. This is advantageous, for example, if a particular object at a particular depth in the ground needs to be examined with greater accuracy. By limiting the range of trigger delays to that depth, it is possible to sample many more repetitions of the received signal that correspond to that depth, and those repetitions can then be combined to achieve a greater Signal-To-Noise Ratio (SNR).

Timing of Sampling Incorporating Delay-Line Calibration.

The use of a synchronous digital circuit for generating the coarse trigger signal means that the timing of the coarse trigger signal is very accurate. However, the delay line that enables fine delay adjustments can be inaccurate. For example, the actual delay might be off by as much as ±15%, compared to the nominal value specified by the digital input number. Such discrepancy is caused by a variety of causes, some of which are intrinsic to the delay line, while others are associated with the unavoidable distortion introduced by the delay line, and the fact that such distortion depends on the delay value specified by the digital input number. All of these causes lead to a discrepancy that might be variable in time and as a function of operational parameters.

In accordance with an illustrative embodiment, to achieve the desired accuracy in spite of such discrepancy, the delay line is calibrated frequently during normal operation. To achieve such calibration, the input to the ADC is obtained from an analog switch configured as a 2-to-1 multiplexer. In other words, the switch has two inputs and one output, with the switch output connected to the ADC input. The switch is controlled by a control signal that directs the switch to connect one or the other of its two inputs to its output. The control signal is generated by the digital circuit.

One of the two inputs of the analog switch comes from the receiving antenna, while the other input comes from the transmitting antenna (with a suitable attenuator to compensate for the fact that the transmitted signal is much stronger than the received signal). Therefore, through the switch, the ADC can be configured to sample either the received signal or the transmitted signal.

In accordance with some embodiments, to achieve calibration of the delay line, the transmitted signal is sampled a first time with the delay line configured (via the digital delay number) for a short delay; for example, the delay line could be configured for a delay of 2 ns. For this first sampling, the coarse delay is configured for a value that yields a suitable sampling time; i.e. a sampling time near a steep slope in the signal being sampled (which is the transmitted signal). Next, the coarse delay is changed to be 5 ns less. Because the coarse delay is very accurate, the overall delay (fine plus coarse) is thereby decreased by 5 ns with little inaccuracy. Finally, the fine delay is changed by changing the digital delay number applied to the delay line, until a value of the digital delay number is found which yields exactly the same sample value as was obtained earlier in the first sampling.

Nominally, the new value of the digital delay number ought to correspond to 2+5=7 ns of fine delay. This is because the longer fine delay compensates for the fact that the coarse delay has been decreased by 5 ns. In practice, due to delay-line inaccuracy, the added nominal delay might be more or less than 5 ns. This value can be stored and used for calibration. Accurate values for the fine delay can then be achieved by generating digital delay numbers that are corrected upward or downward in proportion to the discrepancy observed in the stored calibration number.

The calibration procedure described in the previous paragraphs can be repeated multiple times with different values of the initial short delay (other than 2 ns) for the purpose of characterizing the response of the delay line over the full range of possible values of the applied digital delay number. Such multiple calibration measurements can then be combined to yield a model of how the actual fine delay depends on the value of the applied digital delay number.

Reconfigurable System Implemented Via Programmable Flexibility.

Through the digital circuit, a number of parameters can be adjusted by the end user as part of normal operation. In accordance with an illustrative embodiment, sampling interval, number of samples, pulse-repetition rates, time windows, position, and total time window duration can all be adjusted and customized by the end user as needed. In GPR, a "channel" is defined as the capability of probing the ground with one type of signal. A system is said to be multi-channel if it can transmit a plurality of different types of signals for probing the ground. With the present invention, a multi-channel system can support any number of channels by comprising multiple signal generators. For example, the output of the delay line might be connected to a plurality of signal generators. Some of these signal generators might be pulse generators, while others might generate other types of signals. The digital circuit can generate multiple control signals to selectively activate one or more of the signal generators. For example, one signal generator at a time might be activated to receive the trigger signal from the delay line. Samples obtained through the ADC when a particular signal generator is active yield measurements for the channel associated with that signal generator. This way, a single instantiation of the digital circuit, ADC, delay line, etc., is sufficient for implementing a multiple-channel system.

Reference Pulse Timing.

As already mentioned in a previous paragraph, the input to the ADC is obtained from an analog switch configured as a 2-to-1 multiplexer, with the switch controlled by a control signal generated by the digital circuit. Therefore, in accordance with an illustrative embodiment, the same identical circuitry is used, at different times, to measure the timing of the transmitted signal (when the analog switch connects to the reference pulse) and the timing of the received signal (when the analog switch connects to the receiving antenna). As a result, any errors introduced by cabling delay, circuit delay, unknown delays through the dedicated circuit, etc. are no longer a problem.

Time-Varying Amplifier Gain.

In an illustrative embodiment, the digital circuit also generates a second digital number that controls the gain of the amplifier. For example, the second digital number can be applied to a Digital-to-Analog Converter (DAC) that produces an output voltage in proportion to the value of the number. That voltage can then be applied to a voltage-controlled attenuator, or to a voltage-controlled variable-gain amplifier. The digital circuit adjusts the value of the second digital number in synchrony with the trigger delay. The value can be selected to simulate a linear gain variation, as would be produced by the prior-art saw-tooth waveform, but other patterns of gain variation are now possible.

The relationship between the value of the second digital number and the amplifier gain can be measured as part of the manufacturing process and stored in non-transitory memory. Such stored relationship can then be used in normal operation, when reconstructing the actual received signal, to establish with great accuracy what the amplifier gain was at the time when each portion of the received signal was sampled, based on the value of the second digital number that was applied to the DAC at that time.

The flexibility afforded by the use of the digital circuit makes it possible to adjust and customize the pattern of gain variation of the amplifier, as a function of sampling time, based on specific conditions of each measurement. For example, it is possible to adjust amplifier gain up or down, in real time, based on the observed strength of the received signal at different points in the received waveform. Among other advantages, this can reduce the dynamic range required of the amplifier and the ADC by adjusting amplifier gain, at each point in the received waveform, to always yield a sampled signal value that lies within a narrow range. The actual signal value can then be reconstructed from the known amplifier gain, but the amplifier and the ADC always see an input signal that lies in the narrow range, which means that they need to have only a dynamic range sufficient for the narrow range.

Multi-Frequency Operation.

When an antenna is used at a frequency different from the one for which it is optimized, the signal is impaired in various ways. In a radar system, a particularly harmful type of impairment is what is commonly known as "ringing". This impairment manifests itself as a stretching of the actual received signal, such that a received echo from a reflecting object has a longer duration than the signal that was fed to the transmitting antenna, even if the reflecting object is of small size. Such stretching reduces the accuracy with which the exact timing of the reflected signal can be measured, resulting in a reduction of the accuracy with which the position of the reflecting object can be estimated.

The capabilities of the digital circuit described in the previous paragraphs make it possible to obtain an accurate digitized version of the received signal even in the presence of clutter and multiple echoes. The actual received signal is the result of a convolution between the stretched signal that would be received with just a small reflector and the actual pattern of reflectors. It is possible to reconstruct the actual pattern of reflectors from the received, convolved signal through mathematical processing of the actual received signal known as "de-convolution". In accordance with an illustrative embodiment, the use of de-convolution enables a system to use one antenna for transmitting, or receiving, different signals at different frequencies, thus reducing the number of antennas required by the system.

The different received signals can be viewed as separate channels, combined, and/or filtered to achieve an equivalent of any center frequency and bandwidth within the overall frequency range of the system. The different signals can be pulses, or narrow-band waveforms, or other intermediate signals, or a combination of such signals. For example, it is possible to deliberately transmit pulses that are somewhat stretched (e.g., wavelets) with different center frequencies, and then use de-convolution to reconstruct the actual pattern of reflectors.

Multi-Channel Operation. In a system that implements multiple channels, there typically are multiple signal generators. For example, there might be separate signal generators, one for each channel. The digital circuit can be used to send different trigger signals to different signal generators. For example, there might be a single delay line, for generating a single trigger signal, followed by a digital selector for sending the trigger signal only to the signal generator selected by the digital selector. Different signal generators can be selected at different times. Alternatively, it is possible to have multiple delay lines for generating multiple trigger signals and, thereby, have multiple signal generators transmit simultaneously. Other combinations are also possible.

In a GPR system wherein multiple signal generators are connected to a single antenna, something is needed for connecting only one generator at a time to the antenna. In an illustrative embodiment, this is accomplished using so called "PIN" switches, which are Radio-Frequency (RF) switches realized with p-i-n diodes (aka, "PIN diodes"). PIN diodes are used to combine the multiple signals and provide signal isolation. The high peak inverse voltage rating of the PIN diodes provides protection to the inactive signal generators. Depending on the magnitude and frequency of the transmitted signal, an enable signal may be used to forward bias the diode. This increases the capacitance of the diode and allows the signal to pass undistorted.

Accessory Mount.

In an illustrative embodiment, the housing of the system comprises a mounting point located above the center of the antenna housing. This mounting point is available for mounting various accessories such as, for example, a Global Positioning System (GPS) antenna, and/or an Electro-Magnetic (EM) sensor, or an array of EM sensors.

Multichannel EM Sensor Array.

In an illustrative embodiment, multiple EM sensors are arranged at positions that are offset from one another, thereby enabling more accurate depth/distance measurements of EM signals than a single EM sensor. Furthermore, in some embodiments, multiple channels are digitized by an auxiliary ADC, which digitized channels are then received by the digital circuit. These channels consist of filtered inputs separated into different frequency bands for each EM sensor. These channels are then further separated into finer frequency bands by the digital circuit through a Digital Signal Processing (DSP) filtering algorithm. This enables measurement of multiple EM signals simultaneously.

Improved GPS Accuracy Via Slope Detection.

When the GPR system is used on level ground, the GPS receiver provides an accurate estimate of the positions of objects that are detected in the ground at different depths below the GPR system. However, if the GPR system is used on sloping ground, for example on the side of a hill, the position of the GPS antenna will not be vertically above the detected objects. In an illustrative embodiment, the GPR system can be equipped with a slope sensor; for example, an array of accelerometers might be configured as a slope sensor; or a plurality of GPS receivers affixed to the system at different positions might be used as a slope sensor.

The slope sensor provides an estimate of slope parameters, such as slope angle and slope orientation, to the digital circuit. The estimated positions of objects detected in the ground can then be corrected, based on the observed slope parameters, to yield more accurate estimates. The correction is also based on the known distance and orientation of the GPS antenna relative to the GPR transmitting antenna, as altered by the presence of the slope. The slope measurements can also be used to correct the overall radar data for antenna tilt.

Path Reconstruction Via Digital Compass.

In the prior art, the GPR system has no way of knowing the direction in which the cart is moving. Distance measured by the shaft encoder might be in a straight line or in a curved path, or the path might comprise turns that might be tight or loose. As a result, the system cannot determine the position of the cart, relative to an initial starting position, unless the cart operator is careful to push the cart only in a straight line. However, in practice, GPR systems are often used to examine ground over an extended area, such that the path of the cart involves multiple changes of direction. For example, a rectangular area might be examined by moving the cart back and forth over a plurality of parallel tracks that are arranged near one another, with the cart following a pattern similar to the weft of a piece of textile. In such a situation, the information provided by the shaft encoder, which is only the distance traveled, is inadequate for estimating the position of the cart.

In an illustrative embodiment, a GPR system can be equipped with a compass which can be, for example, a magnetic compass that measures the orientation of the cart relative to the magnetic field of the Earth. The information from the compass can then be combined with the information from the shaft encoder to generate an estimate of the position of the cart, relative to an initial starting position, even if the cart travels in a curved path or executes turns that can be tight or loose. This is because the compass provides an estimate of the direction of motion of the cart at all times.

The digital circuit can then perform the necessary calculations for position estimation, and the GPR data measured by the GPR system can be associated with the estimated position. For example, the GPR system might provide the end user with a two-dimensional, horizontal map of where underground features are located at what depth. Alternatively, GPR data might be represented in a full three-dimensional format (with two horizontal coordinates plus vertical depth).

In some embodiments, as an alternative to, or in conjunction with, a compass, the system also employs an inertial navigation system based on accelerometers or gyroscopes for the purpose of achieving an accurate estimate of the horizontal position of the cart. In some further embodiments, an accurate GPS receiver, such as a differential GPS receiver, might also be used, alone or in conjunction with a compass or inertial navigation system. A single gyroscope can also be used, in place of a magnetic compass, for estimating direction of motion relative to an initial position.

Mechanical Considerations.

In some embodiments, a GPR system in accordance with the invention is fitted with an accelerometer that can be used to determine relative distances for the purpose of triggering radar scans, without use of GPS or optical encoder.

In some embodiments, an arrow is molded into the system housing to indicate the center line of antenna. This provides greater precision for GPR locating.

In some embodiments, ratchet straps for height adjustment can be utilized to hold the chassis with the antenna and electronics. This provides shock absorption for the electronics as well as making it easier to push the cart around.

In some embodiments, a spring-actuated plunger pin provides positive locking in both upright and collapsed position for the handlebar support rod.

In some embodiments, a "wear tray" is screwed to the bottom of the antenna housing for protection of the antenna. This tray is a plastic shield that covers the antenna, such that the GPR system can rub against the ground without damaging the antenna: it is the wear tray that rubs against the ground. As such, the wear tray is subject to substantial wear and tear. In the prior art, the wear tray is affixed to the GPR system by means of adhesives. In contrast, in accordance with the present invention, the wear tray is affixed with screws, which makes it easier to replace the wear tray as needed

What is claimed is:

1. A ground-penetrating radar system for detecting subsurface features, comprising:
   an amplifier for amplifying a received radar signal;
   a digital circuit for generating a digital representation of an amplifier gain;
   a slope sensor, wherein the slope sensor estimates slope parameters of sloping ground and transmits same to the digital circuit, the slope parameters for use in correcting estimated positions of the subsurface features located below the sloping ground.

2. The ground-penetrating radar system of claim 1 wherein the slope sensor comprises an array of accelerometers.

3. The ground-penetrating radar system of claim 1 wherein the slope sensor comprises a plurality of GPS receivers, wherein the GPS receivers are affixed to the ground-penetrating radar system at a plural positions.

4. The ground-penetrating radar system of claim 1 wherein the slope parameters comprise slope angle.

5. The ground-penetrating radar system of claim 1 wherein the slope parameters comprise slope orientation.

6. The ground-penetrating radar system of claim 1 and further comprising a GPS antenna that receives GPS signals and an antenna that transmits electromagnetic radiation in the VHF to UHF bands, wherein the correcting of estimated positions of the subsurface features is also based on a distance and orientation of the GPS antenna relative to the transmitting antenna, as modified by the slope parameters.

7. The ground-penetrating radar system of claim 1 and further comprising a display for displaying an image that is representative of a subsurface being scanned by the ground-penetrating radar system, wherein the image is corrected by the slope parameters.

8. The ground-penetrating radar system of claim 1 further comprising a plurality of antennas that transmit electromagnetic radiation in the VHF to UHF bands.

9. A method for imaging subsurface features, the method comprising:
   transmitting, via an antenna, electromagnetic radiation in the VHF to UHF bands of the radio spectrum;
   detecting signals reflected from a subsurface feature;
   assigning GPS coordinates, received via a GPS antenna, to the subsurface feature; and
   when the electromagnetic radiation is transmitted through sloping ground:
   (a) estimating slope parameters of the sloping ground; and
   (b) correcting the GPS coordinates based on the slope parameters.

10. The method of claim 9 wherein the slope parameters comprise an angle of the slope and an orientation of the slope.

11. The method of claim 9 and further wherein information contained in the reflected signals is corrected for a tilt in the antenna that transmits the electromagnetic radiation, the tilt resulting from the sloping ground.

12. The method of claim 9 wherein estimating slope parameters further comprises obtaining readings from a plurality of accelerometers.

13. The method of claim 9 wherein estimating slope parameters further comprises obtaining readings from a plurality of GPS receivers.

14. The method of claim 9 and further wherein correcting the GPS coordinates further comprises altering, based on the slope parameters, a distance and orientation of the GPS antenna relative to the antenna that transmits the electromagnetic radiation.

15. The method of claim 9 and further wherein transmitting further comprises transmitting, via plural antennas, electromagnetic radiation in the VHF to UHF bands of the radio spectrum.

* * * * *